March 13, 1956   W. T. LIVERMORE   2,737,824
AUTOMATIC TRANSMISSION
Filed Sept. 24, 1949   7 Sheets-Sheet 3
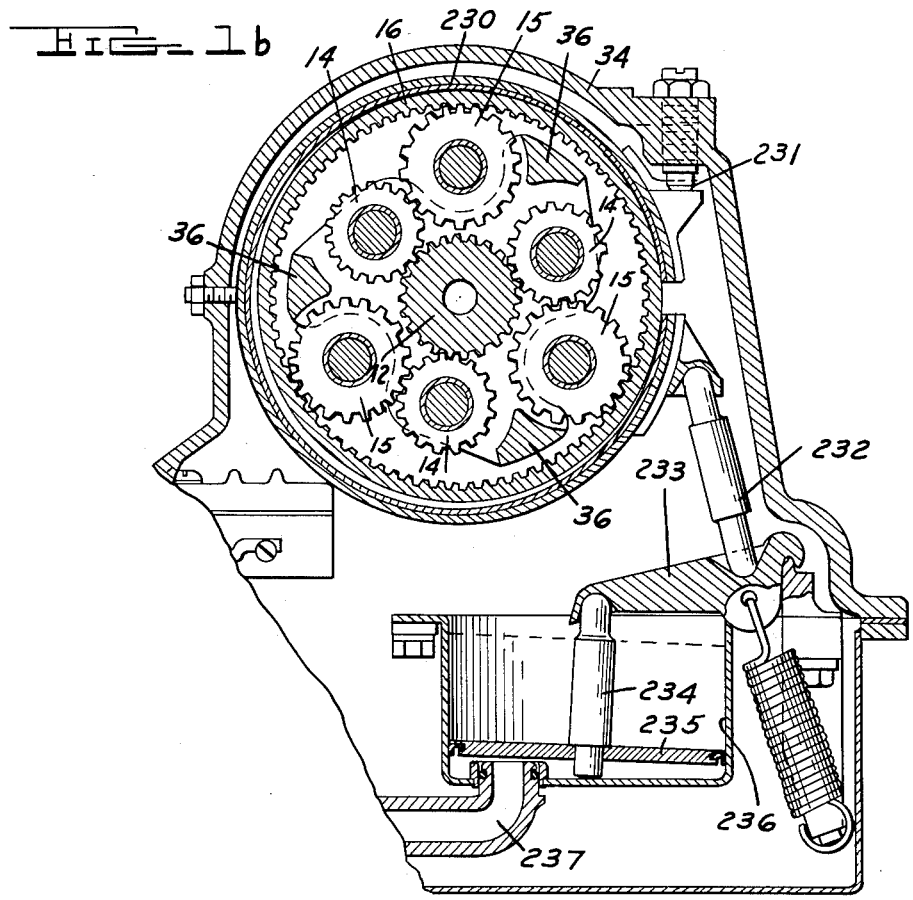
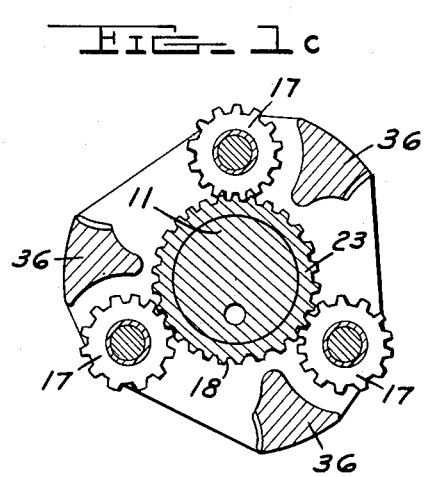
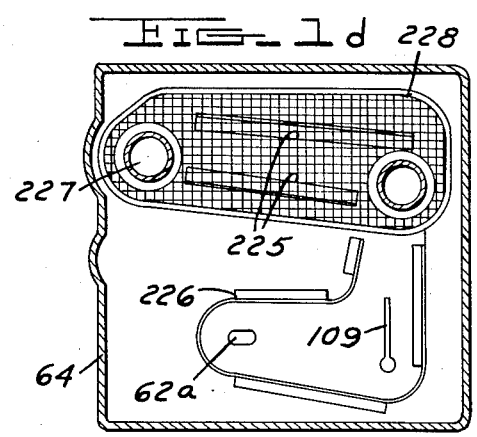
INVENTOR.
WILLIAM T. LIVERMORE
BY
*Farley Forster & Farley*
ATTORNEYS

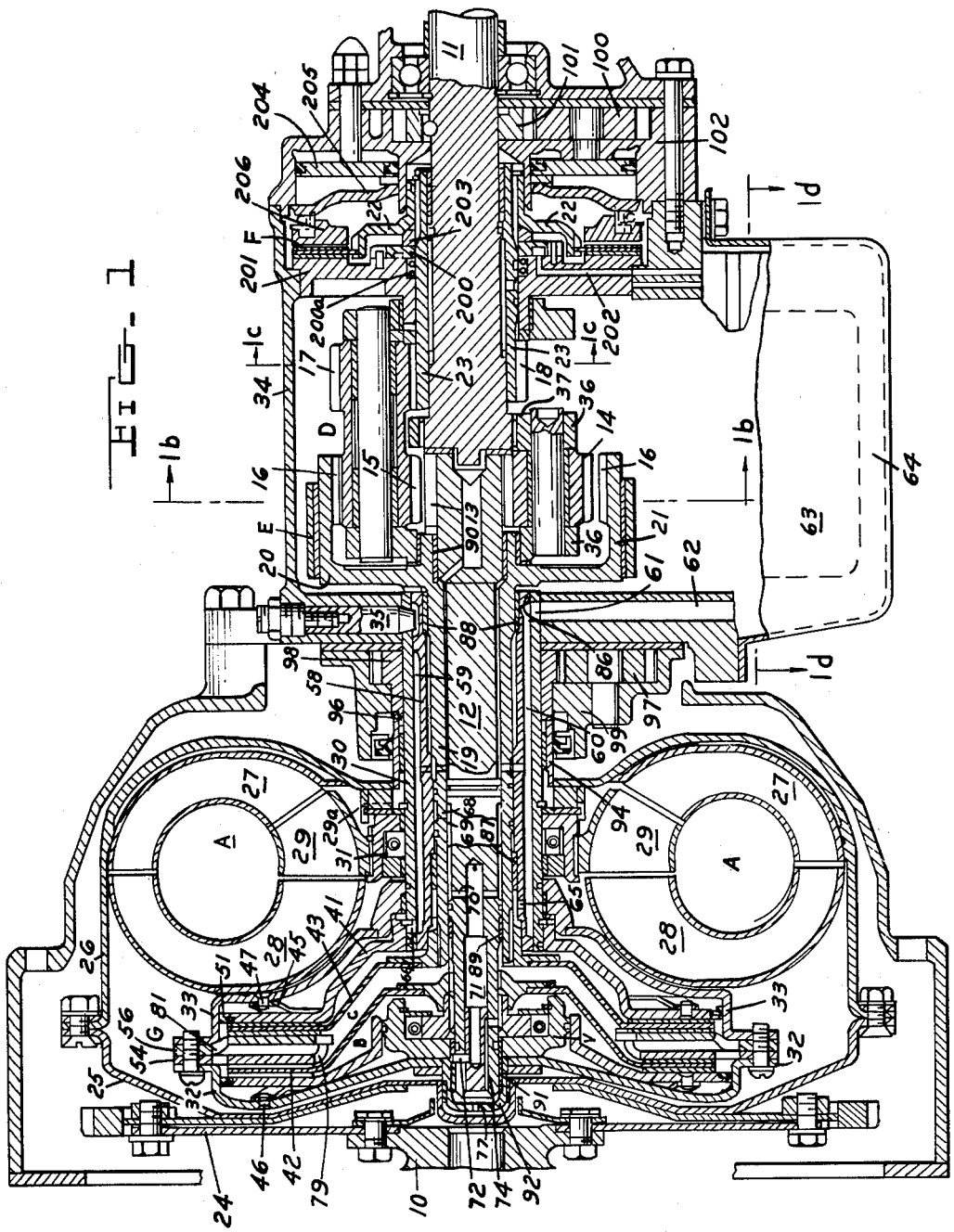

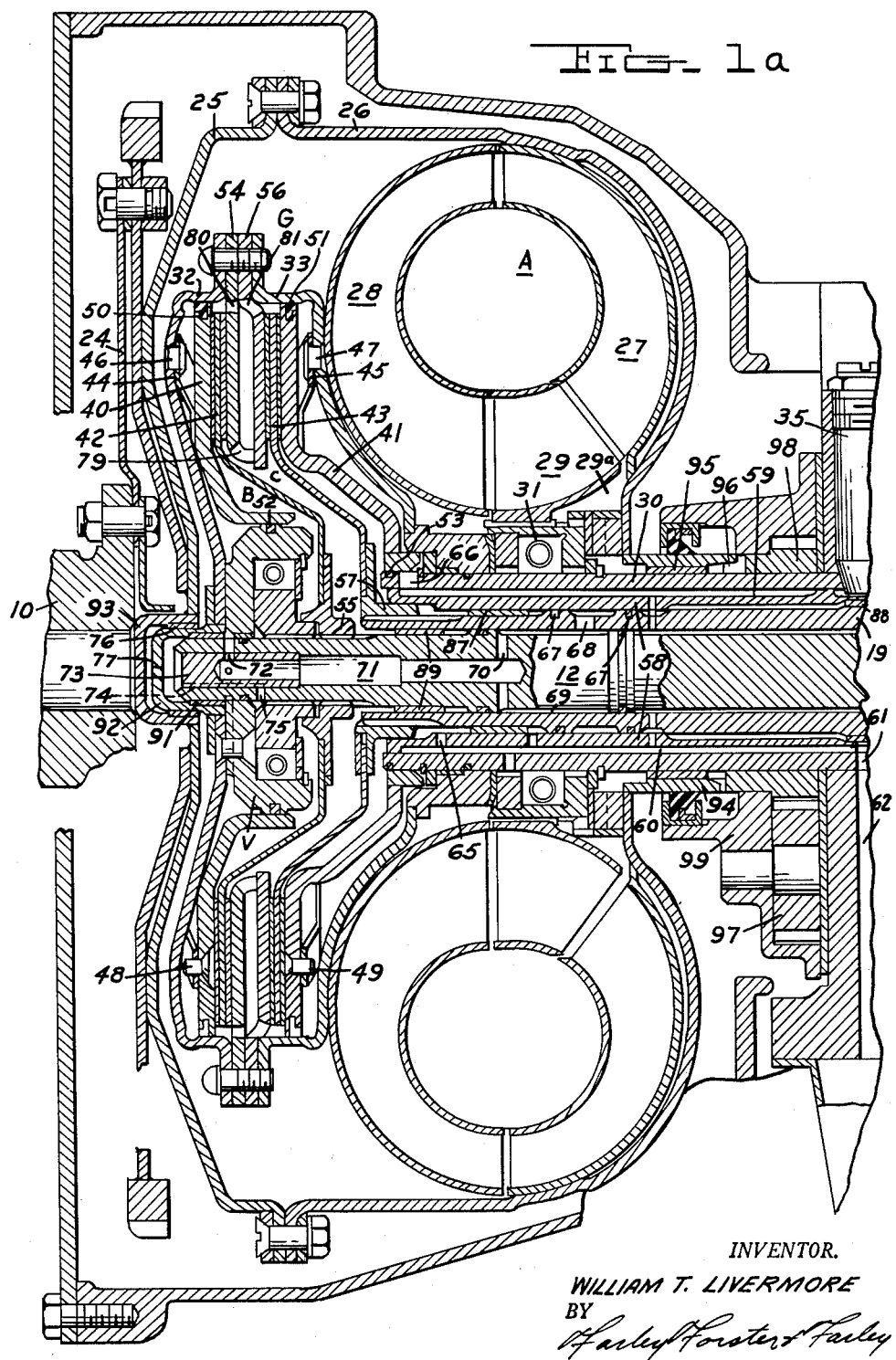

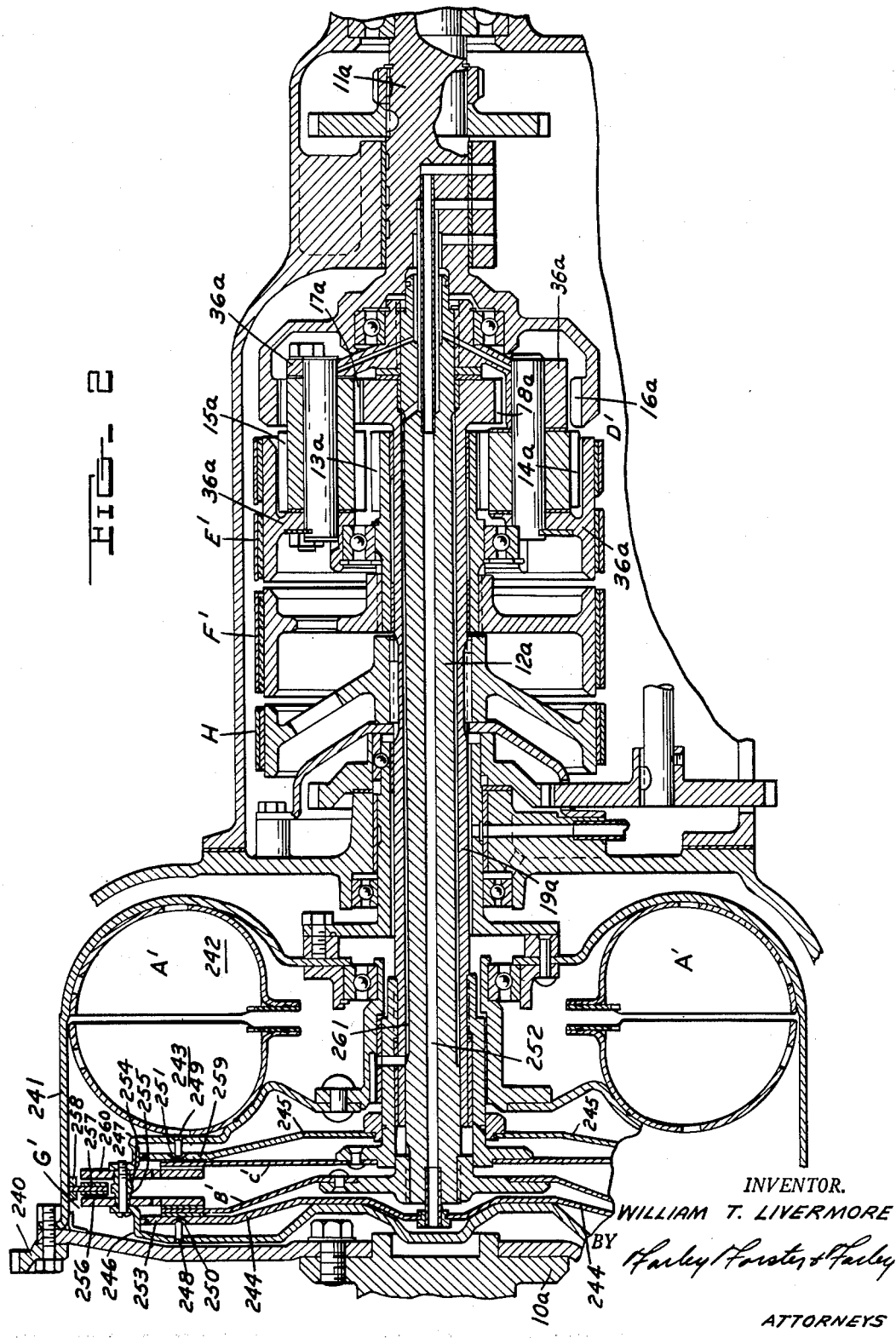

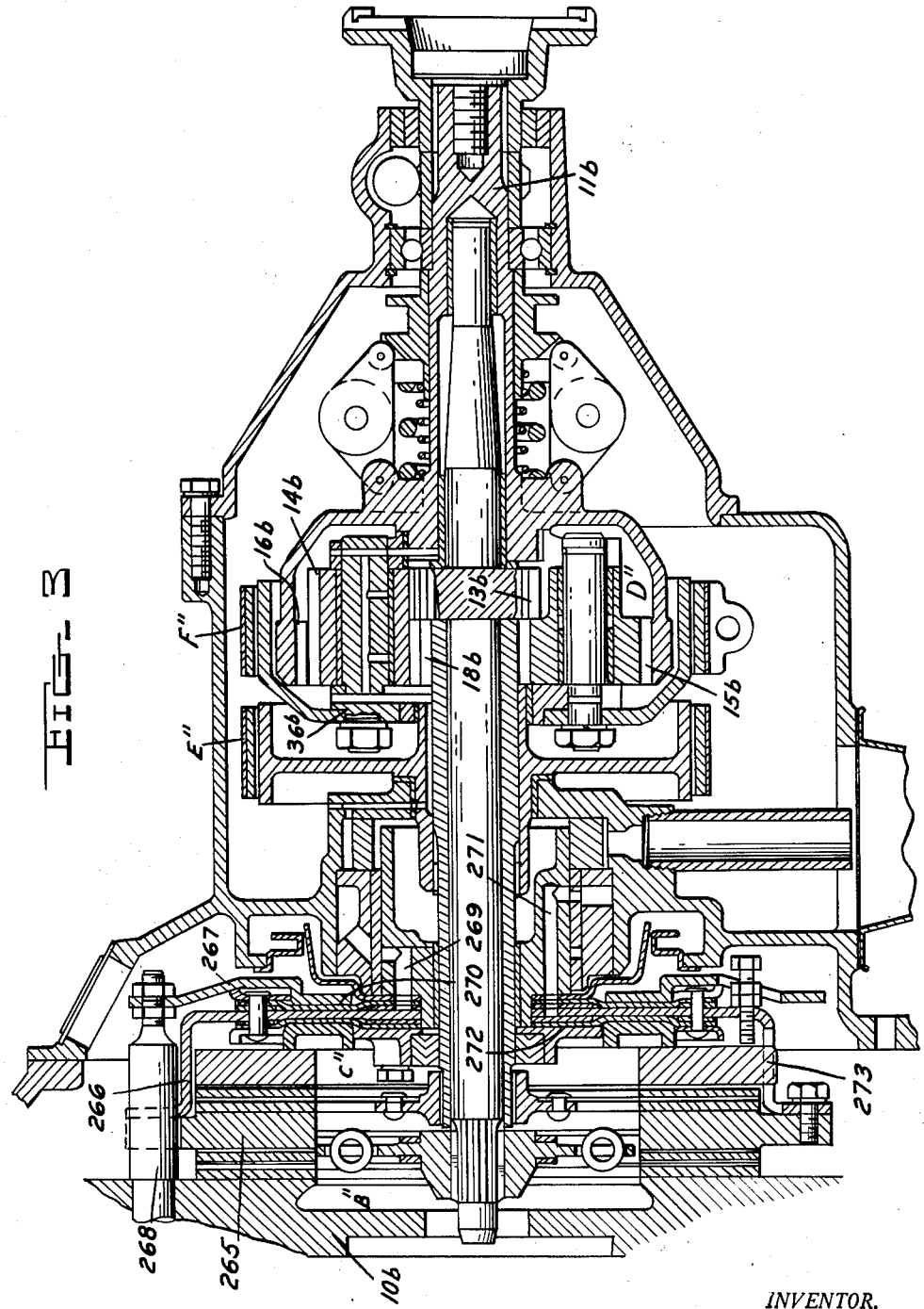

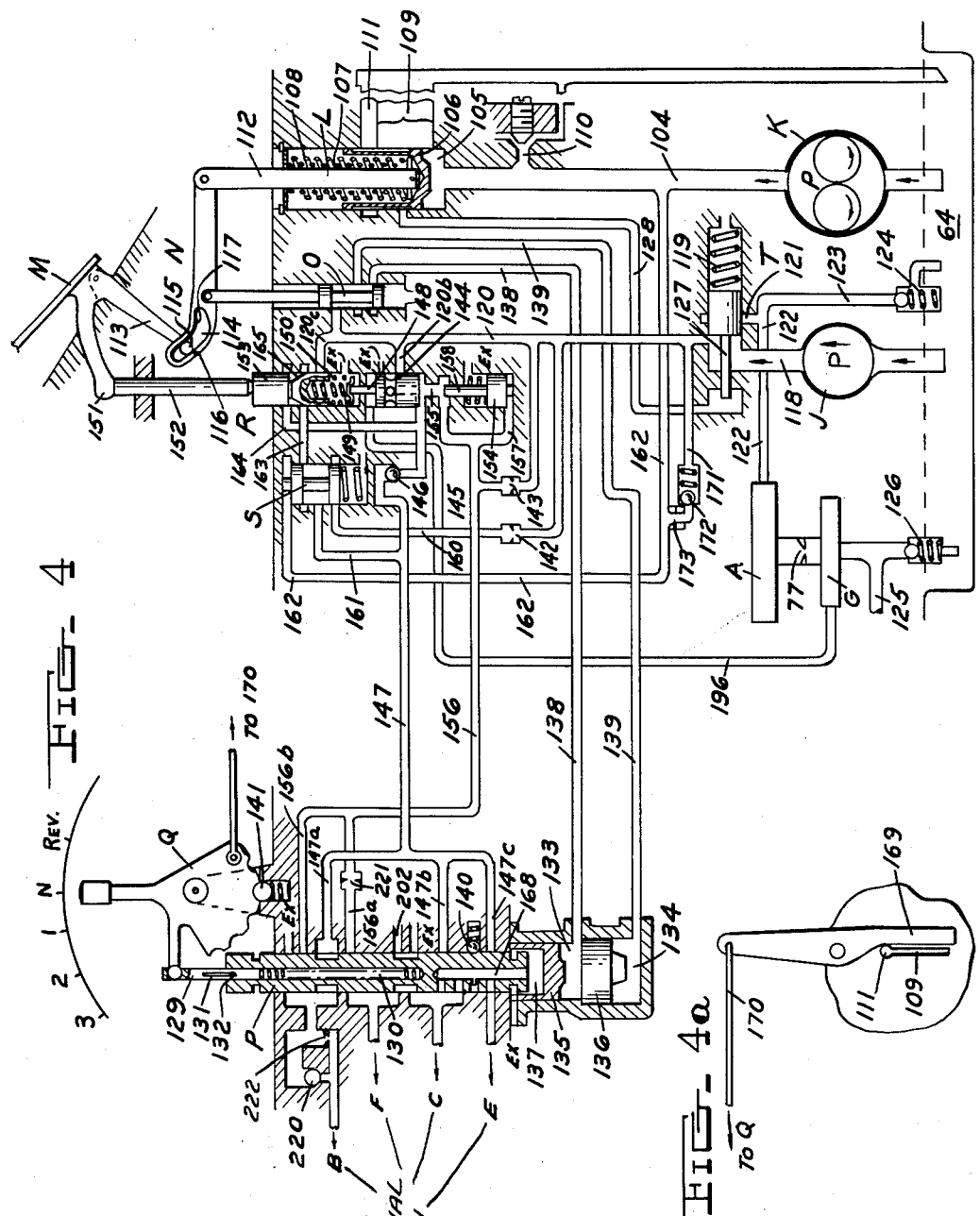

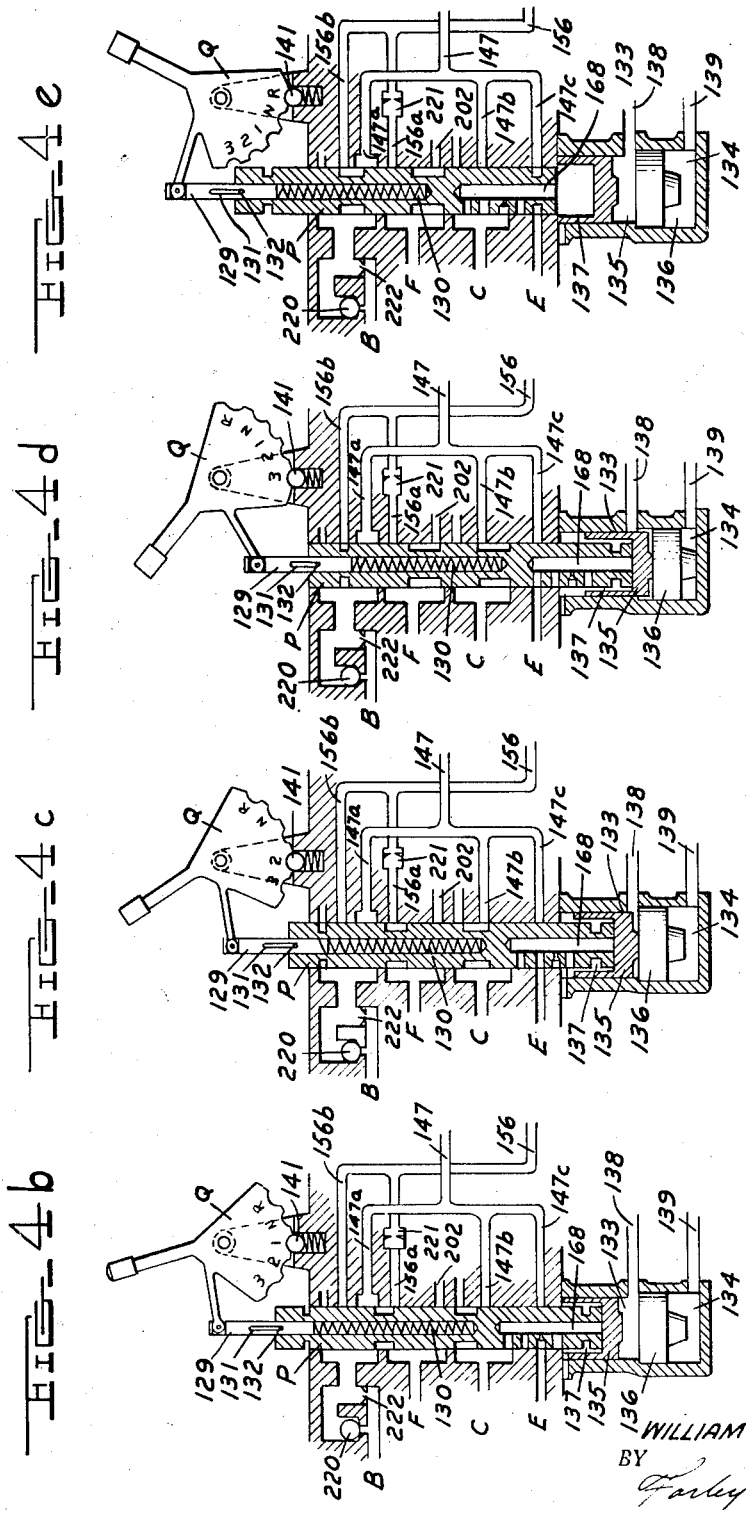

United States Patent Office 2,737,824
Patented Mar. 13, 1956

2,737,824

AUTOMATIC TRANSMISSION

William T. Livermore, Grosse Pointe Farms, Mich.

Application September 24, 1949, Serial No. 117,647

16 Claims. (Cl. 74—472)

This invention relates to automatic transmissions for motor vehicles and more particularly to step-shift transmissions incorporating planetary gearing.

In general, the transmissions disclosed herein employ multispeed planetary gearing having sun gear, ring gear, planetary pinion, and carrier elements characterized by two axially aligned sun gears and two interengaging sets of planetary pinions, one set of pinions engaging one sun gear and the ring gear and the other set of pinions engaging the other sun gear and the first set of pinions. This gear arrangement provides four interengaging concentric elements which are potentially engageable with the engine and/or a stationary member of the transmission through frictional connections. These engageable elements comprise each of the two sun gears, the ring gear, and the double pinion carrier. By employing selectively operable multiple frictional connections between the engine, transmission housing and certain of the engageable elements, three or more forward and one reverse drive ratios are obtained in each of three embodiments disclosed herein.

In these three embodiments various modifications of this gearing arrangement are shown in combination with a torque converter, a simple fluid coupling, and with direct clutch connections to the engine omitting the fluid coupling. Fuid pressure actuated frictional connections are also disclosed, as well as a typical automatic fluid pressure control system specifically adapted to one of the embodiments.

The novel aspects of this invention are believed to extend to generic and specific features of the gearing arrangements, various combinations of the gearing with the fluid operated frictional connections, fluid couplings, and controls, as well as a number of specific improvements and constructional features in these various units.

Specifically, it is an object of the present invention to provide an automatic step-shift transmission employing a planetary gear set having four concentric separately rotatable interengaging elements.

Another object is to utilize planetary gearing employing two sun gears, a ring gear, a carrier, and a double set of planetary pinions.

Another object is to employ multiple frictional connections between engine and stationary members and said elements in a manner providing selectively operable multiple forward drive speeds and a reverse speed through the alternate application and/or release of the friction elements.

Another object is to provide planetary gearing including a pair of sun gears, a ring gear, and a double set of planetary pinions on a single carrier, wherein one of the four concentric elements is directly connected to the output shaft at all times; wherein two other of such elements are provided with separately engageable frictional connections to the input shaft; wherein a plurality of such elements, including the fourth, are provided with separately engageable frictional connections with the transmission housing; wherein two of said frictional connections are simultaneously engageable for direct drive; wherein a plurality of reduction ratios are provided each of which is selectively available through the application of one frictional connection with the engine and one with the housing; and wherein drive is initiated and transferred among all available drive ratios, including reverse, simply through the engagement and disengagement of such frictional connections without any requirement whatsoever for shifting interengaging gears.

Another object is to provide a planetary gear arrangement of this type in combination with a torque converter type of fluid coupling.

Another object is to incorporate a pair of fluid pressure operated frictional connections for selectively connecting a pair of engageable elements of a planetary set of this type with the engine of the vehicle.

Another object is to incorporate such frictional connections within the fluid compartment of a fluid coupling.

Another object is to provide such combination with a torque converter type of fluid coupling.

Another object is to provide pistons adapted to act as pressure plates driven at engine speed through flexible straps for engaging such frictional connection elements.

Another object is to provide a fluid drive assembly carried and driven by a flexible plate on the engine's crank shaft and supported at its other end in a flexible support located endwise in the transmission in a manner whereby the engine bearings will not be subjected to any considerable thrust from the fluid drive.

Another object is to provide a reaction member for the torque converter flexibly supported at one end from the transmission and at the other upon a shaft centralized from the engine.

Another object is to provide a sleeve with external grooves fitted inside the reaction member to form oil passages.

Another object is to provide a vent arrangement for assuring complete filling of the converter unit with drive fluid, thereby to avoid cavitation and efficiency losses.

Another object is to provide separate clutch compartments within the converter housing in which the pressure can be separately and selectively regulated.

Another object is to provide circulating passages in the space between pistons and pressure plates to prevent local pressure due to clutch plates rotating at different speeds from that of the clutch compartments.

Another object is to provide fluid control pressure from external gear pumps, one of the external gears of each pump having a driving gear mounted concentric with the main shaft.

Another object is to provide an hydraulic control governor incorporating a number of operational and constructional improvements over prior constructions.

Another object is to provide improved mechanism for obtaining fluid pressure necessary to start the vehicle through towing.

Another object is to provide mechanism for localizing the control oil warmed by the engine-driven pump and converter unit to enable such control oil to warm rapidly ahead of the entire supply.

Another object is to provide an improved differential control for timing shifts in accordance with variations of throttle opening and vehicle speed.

Another object is to provide mechanism to reduce the pressure head against which the pumps deliver the circulating fluid as the vehicle speed increases.

Another object is to provide a manual shift arrangement adapted to selectively limit the highest speed drive which will be automatically obtained, as well as to permit manual downshifts whenever desired.

Another object is to incorporate shift-timing valves actuated by relief of end thrust resulting from relief of torque on shafts carrying helical power-transmitting gears.

Another object is to provide a valve arrangement for controlling frictional connection build-up pressures adapted to cause a fast build-up of initial pressure to a value dependent upon torque requirements and to provide a restricted build-up beyond such value.

Another object is to provide anticreep mechanism adapted to limit frictional connection engagement to a nondriving pressure when the vehicle is standing still with the accelerator pedal released; and which is further adapted to apply drive-engaging pressure when the throttle is opened, such mechanism incorporating a provision to permit the pressure to build up to line pressure whenever the car is in motion regardless of throttle position, thereby to provide effective engine braking.

These and other objects will be more apparent from the following detailed description of three embodiments of my invention, as well as from examination of the drawings forming a part hereof, wherein Fig. 1 is a longitudinal sectional elevation of a transmission incorporating a three forward-speed and one reverse-speed planetary gear set of the type heretofore described in combination with a torque converter type of fluid coupling, a pair of fluid-pressure operated frictional connection elements between engine and gearing and a pair of fluid-pressure operated frictional connection elements between housing and gearing;

Fig. 1a is an enlarged fragmentary view of the converter end of the transmission shown in Fig. 1;

Fig. 1b is a cross-sectional view through the planetary set taken along the line 1b—1b of Fig. 1;

Fig. 1c is a sectional view of the planetary gear set taken along line 1c—1c of Fig. 1;

Fig. 1d is a sectional view taken along the line 1d—1d of Fig. 1;

Fig. 2 is a sectional side elevation of a modified transmission construction incorporating a planetary gear arrangement having fluid-pressure operated frictional connections between three of the engageable elements and the housing, a pair of fluid-pressure actuated frictional connections between two of the engageable elements and the engine, providing four forward and one reverse speed drives, and which incorporates a simple fluid coupling in place of the torque converter of the first embodiment;

Fig. 3 is a longitudinal sectional elevation of another modified construction showing an arrangement of the planetary gearing providing three forward and one reverse speeds with two engine and two housing frictional connections, and omitting any form of fluid coupling;

Fig. 4 is a schematic view of a fluid pressure control system adapted to provide automatic control for the transmission shown in Fig. 1;

Fig. 4a is a fragmentary view of a fluid pressure exhaust slot and shutter valve;

Figs. 4b, 4c, 4d and 4e are fragmentary views of shift valve P for the various drive positions of manual lever Q.

Referring to the first embodiment of Fig. 1, the power-transmitting mechanism proper delivers torque from an input shaft 10 to a propeller or output shaft 11. The power flow for reduction drive passes through a torque converter A, one or the other of frictional connections B or C and planetary gearing D, with one or the other of frictional connection E or F applied to provide a reaction connection with the transmission housing 34. Frictional connection B is connected by a central shaft 12 to a sun gear 13 which meshes with a set of inner planetary pinions 14 and, as best shown in Fig. 1b, a set of outer planetary pinions 15 engage the ring gear 16 as well as the inner planetary pinions 14. Integral extensions 17 of the outer pinions 15 engage a second sun gear 18 piloted on the output shaft 11.

Frictional connection C is connected through a sleeve 19, flange 20 and drum 21 to the ring gear 16. Frictional connection E, when applied, is connected to the ring gear 16 through its engagement with the outer drum 21, while frictional connection F is engageable with sun gear 18 through an annular member 22 splined to sleeve 23 which carries the sun gear 18.

The planetary gearing D is adapted to provide low and intermediate speed reduction ratios which are compounded with the torque multiplication action of the converter A. The low speed reduction ratio is obtained by applying the frictional connections B and F, the latter holding the sun gear 18 as a stationary reaction member, while the former transmits power to the sun gear 13, pinions 14 and 15 and planet pinion carrier 36, which is splined at 37 to the output shaft 11. The one-way clutch V, the outer race of which is rigidly attached to the housing G and the inner race of which is splined to shaft 12, operates in parallel with frictional connection B in transmitting low speed driving torque to shaft 12, but the engagement of frictional connection B is necessary for two directional drive as in obtaining engine braking in low speed. As will be later explained in connection with the control system, the one-way clutch also serves as an automatic timing device in transferring drive to frictional connection C.

The intermediate speed drive is obtained when frictional connections C and F are applied, whereupon power is transmitted through the ring gear 16 to the pinions 17 and carrier 36, the pinion extension 17 reacting against the sun 18 held stationary by the frictional connection F.

Direct drive is obtained by simultaneously engaging frictional connections B and C with frictional connections E and F both released, thereby locking sun 13 and ring gear 16 together for conjoint rotation with the carrier 36 and the output shaft 11.

Reverse drive is obtained by applying frictional connections B and E, power being transmitted through the central shaft 12, sun gear 13 and pinions 14 and 15 to the carrier 36, the outer pinions 15 moving in a reverse direction around the stationary ring gear 16.

Thus it is seen that two forward reduction ratios, a forward direct drive and one reverse reduction ratio may be rendered effective through the alternate engagement and release of four friction elements and that no gear shifting whatsoever is involved.

With reference to the modified construction shown in Fig. 2, the same basic type of planetary gearing is adapted through two engine and three stationary frictional connections to provide two forward reduction ratios, a forward direct drive, a forward overdrive ratio and a reverse reduction ratio. As in the first embodiment, the planetary gear set D' incorporates four concentric elements separately rotatable about the central axis of the transmission, sun gear 13a, sun gear 18a, planet carrier 36a and ring gear 16a. Also like the first embodiment, one sun gear, 13a, engages a set of inner pinions 14a, which in turn mesh with a set of outer pinions 15a having extensions 17a which engage the sun gear 18a and the ring gear 16a. Again, one of the four concentric elements—in this case, the ring gear 16a—has a direct connection to the output shaft 11a, while two of the engageable elements—in this case, the carrier 36a and sun gear 18a—are respectively driven by the engine through frictional connections B' and C', and the fourth engageable element—in this case, the sun gear 13a—is provided with a frictional connection F' to the housing. However, unlike the first embodiment where only one of the engine coupled elements, ring gear 16, is provided with an alternate housing connection E, the modified construction incorporates alternate stationary connections E' and H for both of the engine coupled elements, carrier 36a and sun gear 18a respectively.

The modified construction employs a fluid coupling A' in place of the torque converter A of the first embodiment, and power is transmitted from the input shaft 10a to the output shaft 11a through the fluid coupling A', frictional connection B' or C' and planetary gear set D' as follows:

First or low-speed drive is affected by applying frictional connections C' and F', whereupon torque passes through the tube 19a to the sun gear 18a, driving the outer pinion extensions 17a and ring gear 16a while the outer pinions 15a and inner pinions 14a rotate about and react against the stationary sun 13a held by frictional connection F'. Second-speed drive is effected by releasing frictional connection C' and applying frictional connection B', whereupon torque is transmitted through the center shaft 12a to the carrier 36a which drives the pinions 15a and 14a around the stationary sun gear 13a causing the ring gear 16a to move forward at an intermediate reduction ratio. Third-speed direct drive is effected by releasing the frictional connection F' and reapplying frictional connection C', thereby locking up the sun gear 18a and carrier 36a for conjoint rotation. A fourth-speed overdrive ratio may then be effected by releasing the frictional connection C' and applying the frictional connection H which holds the sun gear 18a stationary. Drive is thereupon transmitted through shaft 12a, carrier 36a, and pinion extensions 17a to the ring gear 16a. Reverse is effected by engaging frictional connections C' and E', drive being transmitted through sun gear 18a, pinion extensions 17a to the ring gear 16a, the carrier 36a being held stationary by the frictional connection.

Referring to the third embodiment shown in Fig. 3, a further modification is shown having the following elements in common with the first two embodiments: Planetary gearing having the same four concentric interengaging elements separately rotatable about the main axis of the transmission, including the two sun gears, 13b and 18b, ring gear 16b, and pinion carrier 36b, as well as two sets of planetary pinions, one of which 15b, engages both the sun gear 18b and ring gear 16b, while the other, 16b, engages the other sun gear 13b and the pinions 15b. One of the four potential engageable elements, in this case the ring gear 16b, is directly coupled with the output shaft 11b. Two of such elements, in this case the two sun gears 13b and 18b, are provided with frictional connections B" and C" to the input member 10b. The fourth element, in this case the carrier 36b, is provided with a frictional connection F" to the housing; and one of the engine coupled elements, in this case the sun gear 18b, is provided with an alternative frictional connection E". Again all of the reduction ratio drives are effected by applying one engine and one housing frictional connection, while direct drive is effected by simultaneous application of both engine frictional connections.

Specifically, first or low-speed drive is engaged by the application of frictional connections B" and F", power passing through the sun gear 13b, pinions 14b, and pinions 15b to the ring gear 16b, while the carrier 36b is held as the stationary reaction member by frictional connection F". Second-speed drive is next effected by releasing frictional connection F" and applying frictional connection E", whereupon the carrier 36b is free to move forward and the sun gear 18b forms the stationary reaction member for an intermediate ratio. Direct drive is then effected by releasing frictional connection E" and applying frictional connection C" locking the two sun gears 13b and 18b together for conjoint rotation. Reverse is effected by engaging frictional connections C" and F", whereupon power passes through sun gear 13b and pinions 15b to the ring gear 16b with the carrier 36b held stationary.

Reviewing the common characteristics of the three embodiments, it will be noted that each employs a planetary gear set having four concentric, separately rotatable, interengaging elements, including two sun gears, a ring gear and a planet carrier, as well as two sets of pinions rotatably held on such carrier, one of which engages one of the sun gears and the ring gear, while the other engages the other sun gear and the first set of pinions. One of these four elements is connected directly to the output shaft in each case, while two of them are provided with releasable frictional connections to the input shaft, and a plurality of them, including the fourth, are provided with releasable frictional connections to the housing. In each case of forward or reverse reduction drive, one engine and one housing frictional connection is applied, while direct drive is effected in each case by applying both engine frictional connections. Low speed and reverse drives are in every case effected by an engine frictional connection to one of the sun gears, while the other nonunitary ratio drives in every case require the frictional connection of one of said sun gears to the housing. In no case is any sliding gear action requiring synchronization of gear teeth involved, either in changing between forward speeds or establishing reverse drive, the initiation and every change in speed ratio being accomplished by the engagement and/or release of frictional connection elements.

In each of the embodiments, the above-described planetary gearing has been shown in combination with a different type of coupling to the engine-driven input member, the first embodiment employing a torque converter, the second a simple fluid coupling and the third a positive drive connection between the input member and engine frictional connection driving member.

The more detailed aspects of each of the embodiments and the operation of the automatic fluid pressure operated control system, which is disclosed herein adapted to control the power-transmitting mechanism of the first embodiment, will now be described.

Referring again to the embodiment shown in Fig. 1, the power flow from the input shaft 10 to the engine-driven housing, generally indicated as G, passes through a drive plate 24, a cover 25, converter housing 26, input member 27 for the torque converter A, and an output member 28 rigidly associated with the housing G. Fluid is redirected by means of a reaction member or stator 29 from the output member 28 to the input member 27. The stator 29 is piloted on a stationary sleeve 30 and is prevented from rearward rotation by a one-way roller brake 31 carried on such stationary sleeve.

The converter functions according to the well-known principles of torque converters to transmit and multiply input torque from the engine to the housing G, which consists of cylinders 32 and 33. When the speed of the output member 28 is low compared to that of the input member 27, as when the vehicle is being started and/or is ascending a steep grade, the torque applied to the output member is greater than the input torque, the difference or reaction torque being taken by the stator through the one-way brake 31 and sleeve 30, the latter being connected to the transmission housing 34 by a pin 35.

As in other torque converters, when the speed of the output member approaches that of the input member, the output torque multiplication factor decreases until output is no longer greater than the input torque. There is then no reaction against the stator. As the speed further increases, the stator 29 tends to turn forward which it is permitted to do by the one-way brake 31. The converter then operates as a simple fluid coupling.

Within cylinders 32 and 33, piston 40 and 41 (Fig. 1a) are adapted to apply pressure to friction-driven plates 42 and 43 respectively. These pistons, 40 and 41, function as pressure plates and are driven from cylinders 32 and 33 by steel straps 44 and 45, three straps being provided for each piston. These straps are riveted to the cylinders 32 and 33 by equally spaced shoulder rivets 46 and 47. They are permitted to pivot about the rivets so that the holes in their opposite ends, as best shown at the bottom of Fig. 1a, may be engaged with equally spaced pins 48 and 49 riveted to the pistons 40 and 41. Being at equal length, the straps centralize the pistons within the cylinders and, since they are made of thin spring steel, they can flex as the pistons move axially, thus forming a frictionless driving connection between the pistons and cylinders. The pistons are sealed at their peripheries by suitable packings 50 and 51 and at their hubs by piston rings or seals 52 and 53. As fluid pressure is conducted to the space between cylinder 32 and piston 40, the piston moves into contact with friction plate 42 pressing it against the reaction plate 54 carried by the housing G, thus establishing drive through plate 42 and its spline hub 55 to shaft 12 and sun gear 13. Likewise, as fluid under pressure is conducted to the space between the cylinder 33 and piston 41, the latter moves into contact with friction plate 43 and its spline cap 57 to tubular shaft 19 and ring gear 16.

With reference to Fig. 1b, the mechanism employed to engage frictional connection E operative only to establish the reverse drive includes friction band 230 adapted to engage the outer perimeter of ring gear 16 with one end of the band anchored to the housing 34 at 231, the other end being actuated by a push rod 232 through lever 233 by piston rod 234 and piston 235 moving in cylinder 236 by fluid pressure from passage 237.

Sleeve 30 fits tightly around another sleeve 58 which has four grooves formed in its outer surface to provide passages for transmitting oil to actuate the engine-driven clutch pistons and to permit oil to flow to and from the converter. Two of these grooves are shown at 59 and 60, and the other two are similar. At their right-hand ends, as seen in Fig. 1, they connect through holes in sleeve 30, as shown at 61, and passages in gear housing 34, as shown at 62, with the valve assembly 63 and sump 64. Groove 60 is the converter return passage. Oil enters it from the converter through hole 65 near its left-hand end. Groove 59 carries oil through hole 66 to actuate piston 41 in applying and releasing clutch C. A similar groove carries oil through a hole (not shown) in sleeve 58 to the space between seal rings 67 through holes 68, clearance space 69, holes 70, 71 and 72 to the space between the cylinder 32 and piston 40 for applying and releasing frictional connection B. The fourth groove which forms the converter inlet communicates with a hole (not shown) leading to the chamber 29a under the converter stator 29.

The plug 73 which closes the end of hole 72 has a flat or groove 74 on its side communicating through hole 75 with the space enclosed by cylinders 32 and 33 which may be termed the engine-driven clutch compartment. As the rotating converter is being filled, the fluid will be thrown first to the periphery of the space within its housing 26 and the central portion will fill last. Thus the air within the housing 26 will be forced to the center and would be trapped in the portion between the housing cover 25 and cylinder 32 if there were no outlet at the center. Such air can, however, flow through grooves in bushing 76 and through a small hole 77 to groove 74 and thence to the clutch compartment from which it can escape through hole 65 and the converter return passage 60 to the sump 35. The purpose of the above-described vent is to make certain that the space between the cover 25 and cylinder 32 is filled with oil so that the centrifugal forces due to the rotating oil on the left of cylinder 32 will not be influenced by the presence of air to set up unbalanced endwise forces on the clutch, cylinder and converter parts. It also provides a flow of oil to lubricate bushing 76.

It is desirable to maintain oil pressure within the converter housing 26 in order to minimize the tendency of the oil to "cavitate" or fail to follow the contour of the vanes causing undesirable noise and low efficiency. A pressure of about 25 pounds per square inch is commonly used. If this pressure were transmitted to the inside of the clutch compartment between pistons 40 and 41, it would act on them in a direction to release the clutches. To overcome this, it would be necessary to use higher pressure than would otherwise be required to apply the clutches. Oil is therefore fed from the converter to the clutch compartment only through the small vent 77 described above. Since the flow is restricted through this small vent, the pressure in the clutch compartment can be controlled separately from that in the converter, as will be presently explained. The pressure within the clutch compartment is maintained at a value only sufficient to obtain prompt release of the clutches when the oil pressure is removed from the opposite side of pistons 40 and 41.

Friction plate 42 turns in an enclosure consisting of pistons 40, cylinder 32 and plate 54. When driving in certain of the ratios this plate 42 idles at a speed greater than the speed of the enclosing parts 40, 32 and 54 due to the action of the planetary gears. Consequently the oil in this enclosure will tend to rotate faster than the oil in other parts of the clutch compartment. If the space in which plate 42 rotates were tightly enclosed, high pressure would be built up in it due to the centrifugal pressure of the rapidly spinning oil. Such pressure would tend to prevent the piston 42 from being moved to the right to apply frictional connection B and, if sufficient pressure were introduced into cylinder 32 to move piston 40, sudden application of the frictional connection might result. To prevent this action space has been allowed between reaction plates 54 and 56 and apertures 79 and 80 are provided to form an open path for free flow of oil from the space in which plate 42 rotates and the remainder of the clutch compartment so that no excessive localized pressure can be built up. A similar condition exists with respect to friction-driven plate 43. However, this plate turns slower than its surrounding parts whenever it is disengaged. The low speed will reduce the centrifugal oil pressure tending to cause piston 41 to engage frictional connection C. Accordingly, apertures 81 are provided to equalize the pressure.

The converter-driven member 28 and stator 29 are located endwise between thrust washers 82 and 83 upon sleeve 30 which is anchored in the gear housing 34 by pin 35. The assembly, consisting of the converter driving member 27, housing 26 and cover 25, is constrained against forward motion by thrust washer 84 and against rearward motion by washer 85 with sufficient clearance to allow for expansion of the cylinders 32 and 33 when filled with oil under pressure. The converter driving assembly 25, 26 and 27 expands due to the oil pressure introduced within it to prevent cavitation, as above noted, as well as that due to the centrifugal force on the oil when rotating at high speed. This expansion is not restricted; it merely causes an increase of clearance at washer 84 or 85.

From the above it is seen that the complete converter is located endwise from the transmission case. Since there are unavoidable manufacturing variations in the lengthwise dimensions of the component parts, it would not be practicable to fasten the converter also to the engine crankshaft in such a way as to constrain it rigidly endwise. The converter would be distorted and heavy thrust loads would be imposed on the bearings of the engine crankshaft and of the converter. Drive plate 24 is therefore made of relatively thin sheet metal so proportioned that, although it is sufficiently strong and rigid as a centering and driving device, it is flexible in a longitudinal direction and will bend enough to compensate for reasonable variations in endwise dimensions with no objectionable force. Another purpose for this flexibility is to permit moderate misalignment between engine and transmission. The plate 24 may be either rectangular or circular and have a variety of cutout portions to provide the desired flexibility.

The entire rotating assembly, including the converter and the above-mentioned frictional connections, is supported at the front end from the engine by input member 19 and at the rear from the transmission case 34 in such a way as to allow for a commercial degree of misalignment of the transmission and engine. At the rear, sleeve 30 has a slip fit within the circular opening 86 in the transmission case 34. It is prevented from rotation or endwise motion by pin 35, but is loose enough so that it and sleeve 58, which fits tightly within, can align themselves upon shafts 12 and 19 journaled within the sleeve 58 on bushings 87, 88, 89 and 90. These sleeves and shafts are thus held concentric with each other and are supported at the front end of shaft 12 by bushing 91 in the forward extension 92 of cylinder 32. This extension is in turn supported by bushing 76 in the forward extension 93 of the converter cover 25 which is centrally located relative to the engine crankshaft flange 10 by flexible drive plate 24. The converter and cover assembly are supported at the rear extension 94 by bushing 95 upon the sleeve 30.

The flexible plate 24 at the front and the loose fit of sleeve 30 in case 34 thus support the entire assembly at front and rear but with enough flexibility so that minor misalignment between engine and transmission will not distort the parts or cause heavy loads on the bearings.

An external gear-type oil pump is driven by the engine through the converter housing extension 94 and jaws 96. It consists of external gears 97 and 98 running within the stationary housing 99. A similar pump consisting of gears 100 and 101 running within housing 102 is driven from the output shaft 11 of the transmission. In each of these pumps the driving gear of the pump is concentric with the main shaft, thus making it unnecessary to provide the usual separate set of gears for transmitting the drive to a pump of this type.

As already mentioned, first or low-speed drive is established by applying frictional connections B and F; second or intermediate speed by frictional connections C and F; third or direct drive by both frictional connections B and C; and reverse by applying frictional connections B and E. A control system adapted to this transmission is diagrammatically shown in Fig. 4 and will now be explained.

In general, the controls are directed to supplying fluid under pressure to the converter A and to applying and releasing in proper timed sequence, automatically coordinated with driving requirements, the frictional connection elements B, C, E and F. The controls are directed to provide completely automatic starting and shifting through all forward drive ratios or, if the driver elects through manipulation of a shift lever, to limit the highest speed ratio to second speed or even the first speed drive, or through the manipulation of such lever to effect a manual return to second or first speed drive from any higher speed drive.

Engine-driven pump J supplies oil under pressure for filling the converter A and applying frictional connection elements, while vehicle-driven pump K operates hydraulic governor L, which in combination with accelerator pedal lever M positions differential lever N and pilot valve O to control the shift valve P during automatic operation. The shift valve P directs and releases fluid pressure to and from the various frictional connection elements and is controlled both by the manual positioning of shift lever Q and the operation of pilot valve O. The pressure control valves R operate to control the rates of initial pressure values for applying the friction elements. Valve S operates whenever the vehicle is stopped to prevent any creeping action and whenever the vehicle is moving to assure absence of frictional connection slippage. Valve T operates to limit the maximum pressure available for actuating the friction elements and to vary such maximum in accordance with requirements, thereby minimizing the pressure head against which recirculating oil is pumped.

The function of the differential control effected by the elements K, L, M, N, and O is directed to produce up shifts to higher speed ratios with increase in vehicle speed and to retard such up shifts with increase in throttle opening. Also, conversely, to produce down shifts to lower speed ratios with decrease in vehicle speed and to retard such down shifts with decrease in throttle opening. Valve O produces up shifts in response to its upward movement and down shifts in response to its downward movement. Hydraulic governor L effects an upward movement of the right-hand end of the differential lever N in response to increase in vehicle speed, while the accelerator M effects a downward movement of the left-hand end of such lever in response to increase in throttle opening.

Since the pump K is driven from the output shaft 11 of the transmission, it will supply a quantity of oil to the hydraulic governor L proportional to the speed of the vehicle. This oil is conducted through passage 104 to cylinder 105 where it acts upon piston 106 to move it upwardly against springs 107 and 108. Oil can escape from cylinder 105 through an opening 109. The oil pressure built up by liquid passing through an opening of any fixed size increases substantially as the square of the quantity of flow. Thus, if the effective area of opening 109 were fixed, the pressure on springs 107 and 108 would increase as the square of the vehicle speed and, if a single spring were used in which the deflection was proportional to the pressure upon it, the piston 106 would then move in proportion to the square of the vehicle speed. However, the opening 109, as best shown in Fig. 4a, is a slot which is uncovered progressively to increase the outlet area as the piston moves upwardly. The pressure head will therefore increase less rapidly than the square of the vehicle speed. A slot of uniform width, together with a single constant rate spring, would result in moving the piston in direct proportion to the vehicle speed. This relation could, of course, be varied by using a slot of non-uniform width or by using a variable spring or springs to produce any desired relation between piston movement and vehicle speed. In the present case, in order to provide a construction consistent with desired shift action and simplicity in manufacture, a slot of uniform width has been employed, together with two springs, one of which, 107, reacts against the piston throughout its entire movement and the other 108 adds to the reactive pressure during the latter portion of the piston's movement.

In order to obtain uniform operation in spite of unavoidable variations in pump displacement and internal leakage arising from conventional tolerances, an adjustable orifice or bleed 110 has been incorporated. The piston travel for a given vehicle and pump speed can be adjusted, by varying this bleed, to be the same for all pumps. A large opening 111 at the top end of the slot 109 prevents an excessive rise in pressure at speeds higher than that required to move the piston to the end of the slot 109.

It will thus be seen that the governor rod 112 moves the right end of the differential lever N upward with increasing vehicle speed following a curve determined by the characteristics of the slot 109 and springs 107 and 108. The accelerator pedal M positions the other end of differential lever N through suitable connections including lever 113, lowering the same as the accelerator is depressed and raising it as the accelerator is released, within the lost-motion limits of the slot 114 in the left end of the lever N.

The arrangement of the slot 114 and lever 113 is such that a roller or pin 115 at the end of lever 113 moves a considerable distance along the slot in response to the movement of the accelerator pedal. The contour of the slot 114 can therefore be utilized as a cam so formed that accelerator motion has the desired degree of effect for all positions of its travel. Thus the first part of the accelerator motion can be made to have only a slight effect in raising shifting speeds and the latter portion a relatively larger effect, or vice versa as desired. The upper edge of the slot controls up shifts, as from first to second and second to third speed drives, because the roller 113 is in contact with this edge when it rises to move the pilot valve O upward. The lower edge of the slot 114 similarly controls down shifts and can be formed to effect down shifts in desired degree for all positions of the accelerator travel. Since the cam contour of the lower edge 116 is independent of that of the upper edge 117, complete flexibility of throttle effect on shifts is obtained, as well as the amount of difference between up and down shifting speeds for any given throttle opening as determined by the lost motion of the roller 115 within the slot at any particular throttle opening.

Oil from the engine-driven pump J is delivered to passage 118 and, after moving valve T against spring 119, to passage 120. After a certain pressure, such as 90 pounds per square inch, has been built up valve T is forced to the right beyond passage 121, whereupon excess oil flows through passage 122 to the torque converter A and through passage 123 to spring loaded by-pass valve 124. After oil in the converter reaches a proper pressure, such as 25 pounds per square inch, by-pass valve 124 opens and permits the surplus oil to flow to the sump 64. Oil can also flow slowly from the converter through the small hole 77 to the clutch compartment G. From there it can flow to passage 196, the purpose of which is later described, and through passage 125 to various parts of the transmission requiring lubrication. By-pass valve 126 maintains a light pressure, for example, 10 pounds per square inch, in the clutch compartment for use in releasing the clutches and returning the excess oil to the sump 64.

As the vehicle speed rises, the converter loses its effectiveness as a torque multiplying device, and the oil pressure required to prevent the frictional connections from slipping at full engine torque becomes progressively less. Since the amount of heat generated and power used by the front engine-driven pump J depends upon the pressure head against which it must pump, it is desirable to reduce this pressure in accordance with reduced requirements as the vehicle speed increases. This is accomplished by the plunger 127 associated with the valve T. After the vehicle speed reaches a predetermined point, the movement of the governor piston 106 opens communication of vehicle pump pressure with the passage 128 and plunger 127. Thereafter such pressure, which increases with vehicle speed, acts to overcome the reaction force of spring 119 so that a progressively lower pressure developed by the engine pump J will be sufficient to move the valve T to uncover the passage 121. The pressure maintained in line 120 is thus gradually decreased as car speed increases.

Shift valve P is operated from manual shift lever Q through lost-motion link 129 and spring 130. Link 129 can slide in the valve P within the limits established by a slot 131 and pin 132 which is anchored in valve P, but link 129 is urged by compression spring 130 to the position shown in Fig. 4 with the lower end of the slot against the pin 132. Thus, in the absence of resistance at its lower end, valve P will follow the position of the hand lever Q. The valve P has various passages, described below, which transmit oil under pressure to operate the various frictional connection elements selectively so that in the positions of the hand lever indicated by Rev., N, 1, 2, 3 the transmission will be in reverse, neutral, first speed, second speed and third speed respectively whenever the valve P follows the motion of the hand lever Q and link 129 (which it is always free to do in the neutral, reverse and first speed positions of such hand lever).

If there is oil pressure in cylinders 133 and 134 holding pistons 135, and 136, respectively, in their uppermost positions and hand lever Q is moved to third speed position, clearance 137 within the piston 135 will permit valve P to move down as far as first speed position and prevent its further movement causing link 129 to move into valve P further compressing the spring 130 and causing the upper end of slot 131 to move against pin 132. If oil pressure is now released from cylinder 133 but maintained in cylinder 134, the piston 135 will be free to move down until it registers against piston 136 permitting spring 130 to move the valve P to the second speed position, whereupon pin 132 will be approximately at the center of slot 131. At this time if oil pressure is released from cylinder 134, valve P and pistons 135 and 136 will all move down under the influence of spring 130 to the third speed position of the valve P, at which time the pin 132 will register against the bottom of slot 131. If oil pressure is now reintroduced successively into cylinder 134 and cylinder 133, valve P will be moved back progressively to second and first speed positions respectively.

If oil pressure is holding pistons 135 and 136 in their uppermost position and hand lever Q is moved to second speed position, valve P will move to first speed position but pin 132 will be displaced only to the center of the slot 131 due to the more limited travel of the shift lever Q and link 129 in reaching second speed position. Thus, if oil pressure is released from cylinder 133, valve P will move to second speed position but will move no further in the event of release of oil pressure from cylinder 134 due to the fact that the pin 132 becomes seated at the bottom of the slot 131 when the valve P reaches second speed position. Similarly, if the hand lever Q is moved only to first speed position, the release of oil pressure from cylinders 133 and 134 will have no effect due to the absence of any displacement of the lost-motion link 129 into the valve P.

Thus it will be seen that, if automatic controls are provided for establishing and releasing oil pressure in cylinders 133 and 134, the shifting of valve P may be rendered automatic for all three speed positions whenever the hand lever Q is in third speed position, and that the highest speed may be limited to either second or first by moving the hand lever Q to either of such positions. Likewise, it will be understood that the valve P may be manually moved from its third speed position to either second or first at any time the manual shift lever Q is so positioned, thus overriding in whole or in part the automatic control established through oil pressure in cylinders 133 and 134.

The automatic control of oil pressure in cylinders 133 and 134 is established by the pilot valve O positioned under the differential influence of vehicle speed governor L and throttle on control lever N, as previously described. When valve O is in the position shown in Fig. 4, oil pressure from the engine-driven pump J communicates from passage 120 through the necked portion of valve O with passages 138 and 139 leading to cylinders 133 and 134 respectively, thus limiting the movement of valve P to first speed position. As valve O moves upward under the influence of increase in vehicle speed and/or decrease in throttle opening, the lower land of valve O passes passage 138 connecting the same to exhaust and releasing pressure from cylinder 133. Further travel of the valve O likewise opens passage 139 to exhaust thereby permitting movement of valve P to third speed position. Conversely downward movement of the valve O under the influence of decrease in vehicle speed and/or increase in throttle opening will successively release the pressure in cylinders 134 and 133 respectively. Thus the transmission may be rendered completely automatic by moving the manual shift lever Q to third speed position or automatic between first and second speeds by moving such lever to second speed position, or held in first speed, neutral or reverse by moving lever Q to a corresponding position.

In order to provide for a relatively positive and fast movement of the valve P, a detent 40 may be employed to engage slight notches in the wall of the valve P corresponding to its various operating positions. The spring pressure of such detent must, of course, be sufficiently light to be readily overcome by the pressure stored in spring 130. The action of detent 141 holding the shift lever Q must, on the other hand, be sufficiently strong to resist compression in spring 130 when the lever is in second and third speed positions.

Fig. 4 shows valve P and manual lever Q in their neutral position, while Figs. 4b, 4c, 4d and 4e show these elements in first, second, third and reverse drive positions respectively. Referring to Fig. 4, it will be seen that frictional connection B is connected to passage 147 through branch 147a and the necked portion of valve P in registration therewith when valve P is in the neutral position, while each of the other friction elements are released through various connections to exhaust ports.

Referring to Fig. 4b corresponding to the first speed position, frictional connection B remains connected to passage 147a which now also communicates with frictional connection F, while frictional connection F also communicates with passage 156 through branch passage 156a. The restriction 221 in such branch line prevents pressures from equalizing in passages 147 and 156 and accordingly the pressure of passage 147 predominates. Frictional connections C and E remain disengaged through exhaust connections for this position of valve P.

With reference to Fig. 4c corresponding to second speed position, it will be seen that frictional connection B is released, while frictional connection F remains engaged through communication with passage 156 and 156a. Frictional connection C now becomes engaged through communication established with passages 147b and 147. Frictional connection E remains disengaged.

Referring to Fig. 4d corresponding to third speed position, it will be seen that frictional connection B becomes de-engaged through pressure from passage 156 and branch passage 156b. Frictional connection F becomes disengaged through communication with exhaust passage 202, while frictional connection C remains engaged through continued communication with passage 147b. Frictional connection E remains disengaged.

Referring to Fig. 4e for reverse drive, frictional connection B is engaged through communication with both passages 156b and 147a, the pressure in passages 147 and 156 being equalized by their open connection with each other through the necked portion of valve P. Frictional connection F is disengaged through communication with passage 202, and frictional connection C is released through exhaust connections through the center passage 168 of valve P. Frictional connection E is now engaged by communication established with passage 147 through branch passage 147c.

The mechanism described thus far will be seen to produce automatic shifting of valve P to each of three forward speed positions in response to the differential effect of vehicle speed and accelerator position. While such mechanism determines the proper timing of shift points from the standpoint of vehicle torque and speed requirements, the avoidance of "creep," the rate of engagement and disengagement of individual frictional connection elements, as well as the timed relationship in changing engagement from one frictional connection element to another in order to obtain complete smoothness of transfer, require further controls which will now be considered.

All torque converters transmit a small amount of torque even at the low speeds at which the engine idles. The same is true of fluid couplings which tend to cause the vehicle to "creep" or move slightly even though the throttle is closed whenever the transmission is not in neutral. Many attempts have been made to remedy this defect, the most obvious way being to arrange the controls so that the frictional connections are released whenever the vehicle is stationary and the throttle closed. However, this method is not satisfactory because after the throttle is opened, some time is required for oil to fill the operating cylinders for the starting frictional connection and to take up the frictional connection clearance. During this time the engine speed increases, thus adding energy to the rotating mass of the fly wheel, converter and converter oil which must then be absorbed in reducing the engine speed as the frictional connection finally comes into engagement. The resulting delay, engine racing and some cases jolting when engagement takes place are highly objectionable. In additional, there is likely to be a disturbing bump when back lash in the drive line is taken up since there is no load on such line until the frictional connection is applied. In order to remedy these difficulties, the present control provides mechanism, generally indicated at R in Fig. 4, for maintaining a very light frictional connection engagement whenever the vehicle is stationary in a driving gear with the throttle released. Such pressure is sufficient to take up clearance bringing friction elements into contact and to take up back lash in the drive line but is insufficient to move the vehicle. By maintaining such frictional contact a very small quantity of oil admitted to the frictional connection actuating cylinder when the throttle is opened will raise the pressure immediately to provide driving engagement and avoid prolonged slippage. Valve 144 provides such operation as follows:

Oil from engine-driven pump J flows through passage 120 and 120b around the necked portion of valve 144 and through center holes in the valve to passage 145, through check valve 146, passage 147 and valve P to the frictional connection operating cylinders. As pressure builds up in passage 145 and on the lower end of valve 144, it moves valve 144 and pin 148 against the resistance of frictional connection release pressure conducted from the clutch compartment G to the upper end of valve 144 through passage 196, as well as against the pressure of springs 149 and 150, until valve 144 closes passage 120b at an oil pressure exceeding the frictional connection release pressure by an amount determined by the spring load. Effective frictional connection engaging pressure in passage 145 is thus maintained at a value depending on the spring load of springs 149 and 150.

In order to maintain light nondriving frictional engagement accurately when the engine is idling, the relatively heavy spring 150 is adapted to lose its compression whenever the accelerator M is released so that the relatively light spring 149 provides the only effective force for establishing the engaging pressure, for example, in the order of three pounds per square inch, in passage 145 and passage 147 which supplies oil to the starting frictional connection F.

Valve S is employed to block communication between passages 160 and 161 whenever the vehicle is stationary. Valve S is moved down to open communication between passages 160 and 161 whenever the vehicle is in motion through pressure from the vehicle-driven pump K connected through passage 162 to the top of valve S.

When the accelerator M is depressed, spring 150 is compressed moving valve 144 to an open position to bring about initial driving engagement of frictional connection F. Initial drive engaging pressure can build up quickly to a value dependent upon throttle opening because the passages through valve 144 are relatively large. Once the vehicle is in motion, valve S moves to connect passages 160 and 161, whereupon the further build-up in clutch pressure will be gradually effected by flow through orifice 142, check valve 146 preventing back flow through valve 144 upon a rise in pressure in passage 147 above that effected by the load of springs 149 and 150. It will be seen that valve S will also operate to maintain full clutch engagement for engine braking whenever the vehicle is in motion, notwithstanding a complete release of the accelerator M and consequent reduction of pressure in passage 145.

In the event of extreme resistance to starting movement and wide-open throttle, for example, in attempting an extremely fast start up a steep incline, it is conceivable that the pressure for initiating driving engagement through valve 144 might be insufficient to produce the vehicle motion necessary to open the valve S under which conditions a racing engine and severe frictional connection slippage might result. In order to obviate this contingency, provision is made for admitting pressure from passage 120 and 120c through the necked portion of plunger 153 and passage 163 through the necked portion of valve S to passage 161 whenever the throttle is opened past a predetermined point with the vehicle stationary. The tapered surface 165 permits the flow through this auxiliary path to increase with throttle opening, thereby to avoid a jolting start even under these extreme conditions.

During an idling condition with the vehicle standing still, the engine will drive the torque converter input member 27 which will in turn drive the output member 28, clutch housing G, shaft 12 and gearing D at a speed somewhat below engine speed due to the resistance of frictional connection F, as well as the friction in the gearing, shafts, etc.

If frictional connection F were now fully engaged instantaneously in response to depression of the accelerator, the inertia of the converter member 28, clutch housing G, shafts and gearing would cause a jolt in establishing initial drive even though slippage could occur between the converter input and output members 27 and 28. Accordingly, it is desirable in establishing initial drive to have pressure established in frictional connection F rapidly to a point, depending on the extent of throttle opening, at which the output member 28 of the torque converter will fully resist any tendency to turn faster as a result of increased engine speed and torque, and that engaging pressure of frictional connection F thereafter build up somewhat more gradually until the driven member 28, clutch housing G, shafts and gearing reach full driving engagement with the output shaft 11. All slippage between engine and output shaft will thereupon take place between converter members 27 and 28 and first speed drive will be fully established. As explained above, such two-stage engagement is effected by valve 144 and orifice 142.

A shift from first to second requires the release of frictional connection B and the engagement of frictional connection C, the driven element of which travels at a speed less than that of the housing G during first speed drive. In making such transfer of drive, it is desirable that frictional connection B be released at an unrestricted rate, leaving first speed drive solely through one-way clutch V, and that frictional connection C be engaged rapidly to a point, depending again upon the degree of throttle opening, at which frictional connection C picks up all the torque transmitted through the one-way frictional connection V, and that thereafter the engaging pressure in frictional connection C be gradually raised, causing clutch V to overrun and finally bringing the converter output member, shafts and gearing into full second speed engagement with the output shaft. The change in speed of the gearing, housing G and driven member 28 to the slower speed corresponding to second speed drive will, of course, increase the resistance on driving element 27 and load the engine to a slower speed corresponding to such intermediate drive. This two-stage engagement of frictional connection C is likewise effected by valve 144 and orifice 142 through branch passage 147b.

In shifting from second to third speed drive, it is necessary to re-engage frictional connection B and release frictional connection F. In doing so it is desirable that frictional connection B be applied rapidly to a point where all of the reaction on frictional connection F is relieved and thereafter more gradually to reduce the speed of the gearing, housing G and driven element 28 to a direct drive ratio with the output shaft 11. It will be noted that in this case frictional connection C continues to deliver a portion of the torque load and that the point at which frictional connection B assumes its share of the torque load and fully relieves the reaction on frictional connection F therefore represents a lighter frictional pressure than would otherwise be required to engage full engine torque. Accordingly, oil to re-engage frictional connection B for direct drive is supplied from valve 144 through a reducing valve 154. As oil flows from passage 145 through passage 155, it builds up pressure upon frictional connection B through passage 156, branch passage 156b and valve P. This pressure also builds up on the large end of valve 154 through branch passage 157. Because of the relatively small area in the plunger 158 which is acted upon by the pressure in passages 145 and 155, valve 154 will shut off the rapid flow to passage 156 at a pressure less than that in passage 145, in proportion to the areas of the two ends of the reducing valve 154. The pressure in passage 145 varies with throttle opening, as above described, and the pressure at which the reducing valve 154 closes will also vary with throttle opening. After reducing valve 154 closes, oil continues to flow through small jet 143, thus raising the pressure gradually to the line pressure of passage 120.

In making the shift from second to third speed, it is desirable for the frictional connection F to remain fully engaged until the torque reaction on it is substantially or fully relieved and that it be rapidly released thereafter. Likewise, in the shift from first to second, shaft 12 is required to turn at the same speed as clutch housing G until full driving torque has been taken over by frictional connection C, whereupon shaft 12 should be free to rotate at a higher speed than clutch housing G.

In the case of the first to second shift, the timing of the release of engagement between housing G and shaft 12 is automatically effected by the one-way clutch V, which freely permits shaft 12 to turn faster than housing G at any time if frictional connection B is released. Accordingly, the timing of transfer is reduced simply to the proper engagement of frictional connection C. In the case of the shift from second to third, an equivalent result in properly timing the release of frictional connection F is accomplished through the use of a thrust washer valve 200 (see Fig. 1) adapted to block the release of pressure from frictional connection F as long as any reaction torque is applied to the reaction sun gear 18 and adapted to open wide the release of frictional connection F pressure upon the release or reversal of torque on the helical sun gear 18. A forward longitudinal component of force from the helical tooth engagement operates through bearing 203, rigidly connected to tubular shaft 23, to hold the valve 200 against stationary member 201 closing port 202 in response to reaction tooth pressure but to permit such valve to open upon the relief or reversal of tooth pressure. A compression spring 200a may be employed to urge valve 200 to an open position somewhat ahead of complete torque release. (It will be understood that pressure for applying frictional connection F through pistons 204, levers 205, and plates 206 is conducted to the back of pistons 204 by separate passages not appearing in the plane of Fig. 1.)

From the above it will be seen that an hydraulic valve control directly responsive to release in torque is adapted to serve precisely the same function as a one-way frictional connection for timing the release of a clutch element in the transfer of drive to a new speed ratio.

To summarize the operation of the automatic controls, when the engine is started with the gear shift in neutral, the engine pump delivers oil under pressure to the converter A and full line pressure to passage 120, as well as to passages 138 and 139 through valve O. Valve 144, with the accelerator pedal released, delivers sufficient pressure to line 147 for light nondriving frictional connection engagement.

If the shift lever is now moved to third speed position, valve P moves to the first speed position shown in Fig. 4b against piston 135, and spring 130 is loaded to permit further travel of valve P upon successive releases of pressure from cylinders 133 and 134. Clearance is now taken up in frictional connection F with nondriving engagement ready for immediate driving engagement upon the depression of accelerator M. Such depression provides immediate pressure through valve 144 to a value dependent upon the extent of throttle opening and, as soon as the vehicle moves, pressure from the vehicle pump opens valve S permitting a gradual increase in the frictional connection actuating pressure in passage 147 by flow through orifice 142 until full line pressure is established.

As the vehicle speed increases the increasing discharge from vehicle pump K raises the hydraulic governor L until under the differential effect of vehicle speed and throttle opening valve O is raised to a position connecting passage 138 to exhaust, thereby permitting a shift of valve P to the second speed position shown in Fig. 4c. Pressure in frictional connection B is now rapidly exhausted, as permitted by one-way check valve 220, and frictional connection C is engaged rapidly by pressure admitted through valve 144 to a value dependent upon throttle opening and thereafter gradually to full line pressure by flow through orifice 142. As the vehicle speed continues to increase and/or the accelerator pedal M is raised, valve O will move to a position exhausting pressure from line 139 permitting valve P to move to third speed position shown in Fig. 4d. Frictional connection B is now re-engaged promptly by oil from line 156 to a value dependent upon throttle opening, the action of valve 144 being modified by reducing valve 154, and a further gradual build-up to line pressure is effected by flow through orifice 143. Frictional connection F remains fully engaged until reduction in reaction torque permits valve 200 to open, whereupon pressure is rapidly released through passage 202.

If under the influence of decrease in vehicle speed and/or increase in throttle opening valve O moves down to a position re-establishing pressure in line 139, the piston 136 will move valve P up to its second speed position shown in Fig. 4c. Pressure in frictional connection B will now be rapidly released through check valve 220 while frictional connection F will be engaged by pressure from line 156. Since a down shift from third to second speed requires an increase in engine speed, for smooth frictional connection engagement orifice 221 is provided in branch line 156a to somewhat delay the engagement of frictional connection F during such increase in engine speed.

If a further decrease in vehicle speed and/or an increase in throttle opening moves valve O further down to a position for re-establishing pressure in line 138, valve P will be moved by piston 135 up to the first speed position shown in Fig. 4b.

Pressure in frictional connection C would then be rapidly exhausted and frictional connection B engaged by pressure from line 147. Since a shift from second to first again calls for an increase in engine speed, it is undesirable to engage frictional connection B rapidly even to the limited extent established by valve 144 and, accordingly, an orifice 222 is provided which in combination with check valve 220 delays the engagement of frictional connection B during a two-one down shift until the necessary increase in engine speed is effected.

To provide means for starting the engine by pushing or towing the vehicle, a shutter 169 (see Fig. 4a) is operated through rod 170 connected to the shift lever Q to close slot 109 when the manual shift lever Q is in the low speed position. A check valve 172 is also provided to connect the vehicle pump circuit with the engine pump circuit. Since the pressure in the engine pump circuit is normally maintained at a higher value than that reached in the vehicle pump circuit with the shutter 169 open, the check valve 172 will be normally closed preventing oil from the engine pump from affecting the operation of the vehicle speed governor L. However, when the engine is not running the engine pump J is not driven to establish pressure in the engine pump circuit. Accordingly, if the vehicle is moved with the shutter 169 closed, the vehicle pump will build up pressure, open the check valve 172 and supply the necessary oil under pressure to engage the clutches for starting the engine.

During normal operation each time a ratio change is made oil is taken from the engine pump circuit to apply a frictional connection. This momentarily reduces pressure in the engine pump circuit and may reduce it below the pressure in governor cylinder 105. An orifice 173 is therefore placed between the vehicle pump circuit and check valve 172 so that any resulting flow from the vehicle pump circuit will be so small as not to affect appreciably the action of the governor L.

At subzero temperatures even a light oil may become very viscous so as to prevent free flow through the slot 109. Accordingly, when the oil is cold, pressure in cylinder 105 will rise more rapidly than normal with an increase in vehicle speed causing premature shifts. However, as soon as the engine is started the engine pump J and the converter come into operation, each performing work on the oil flowing through it and raising its temperature. If the same oil is recirculated without mixing freely with the supply of cold oil in the sump, its temperature will rise very rapidly and serve effectively as a supply of warm oil for the vehicle pump and governor.

With reference to Figs. 1 and 1d, it will be seen that baffles 225 and 226 have been employed to localize the circulation of a small portion of the oil through the engine pump, converter and vehicle pump. Thus oil is delivered to the engine pump from intake 227 and is exhausted from the engine pump circuit into passage 62a, while oil is delivered to the vehicle pump K from intake 228 and discharged back through slot 109. The oil from discharges 62a and 109 is conducted by baffle 226 to a position adjacent the vehicle pump intake 228 and by baffles 225 to a position adjacent engine pump intake 227. This localization of flow is effective as long as the main supply of oil is cold and viscous but, as it too becomes warm and fluid, the turbulence becomes effective to cause a mixture of all oil in the sump.

With reference further to the constructional features of the modified transmissions shown in Figs. 2 and 3, a brief description of distinctive elements will be sufficient for the purposes of this application. In the four speed simple fluid coupling transmission of Fig. 2, the power flows from the engine crank shaft 10a, flywheel 240, cover 241, fluid coupling input member 242, output member 243 to the clutch housing G'. Pistons 244 and 245, slidable within cylinders 246 and 247, are in this case driven at housing speed by a plurality of pins 248 and 249 anchored in the housing G and engaging slots 250 and 251 in the pistons 244 and 245. Fluid pressure from center passage 252 is adapted to actuate piston 244 engaging frictional connection B' and moving reaction plate 253 against shoulder 254 of a spacer bushing 255. An extension 256 of the backup plate 253 also moves against a frictional connection element 257 driven at engine speed by lugs 258 secured to the cover 241. However, since the frictional connection element 257 is free to slide longitudinally on the lugs 258, no driving engagement between the extension 256 and frictional connection element 257 will take place. Likewise, if actuating pressure is released from cylinder 246 and applied to cylinder 247 from longitudinal passage 261 on the outside of central shaft 12a, frictional connection C' will be engaged and backup plate 259 will be moved against the shoulders 254, while extension 260 will move the frictional connection element 257 in the other direction without drivingly engaging the same. However, if frictional connections B' and C' are simultaneously engaged as in direct drive, each of the extensions 256 and 260 will engage opposite sides of the frictional connection element 257, which is wider than the shoulders 254, and thus produce positive driving engagement between the cover 241 and clutch housing G. In this manner the fluid coupling A' may be bypassed in direct drive to avoid any slippage or power loss.

It will be noted that in this modification the frictional connections B' and C' and clutch housing G are again located within the fluid compartment enclosed by cover 241, and that oil is free to communicate between the interior of the clutch housing and the exterior with the driven member 243.

With reference to Fig. 3, no fluid coupling is employed and drive is transmitted from the flywheel 10b which serves as the mounting for the backup plate of frictional connection B'' to the longitudinally slidable center plate 265, driving member 266 and reaction member 267 by a plurality of studs 268 anchored in the flywheel 10b. Fluid under pressure is admitted from passage 269 between diaphragm 270, and member 266 will react against member 267 and move members 266 and 265 forwardly to engage frictional connection B''.

Fluid pressure from passage 271 introduced between diaphragm 272 and member 266 will, on the other hand, move plates 273 and 265, together engaging frictional connection C''. In the case of both transmissions shown in Figs. 2 and 3, actuation of the stationary frictional connections E', F', H', E'' and F'' is accomplished by a mechanism similar to that shown in the first construction.

From the above description, it will be seen that planetary gearing employing the same basic characteristics has been adapted in three specific constructions to provide a plurality of forward step-shift drive ratios either in combination with a torque converter, simple fluid coupling or direct clutch coupling to the engine and that each of such transmissions is rendered adaptable to the provision of automatic controls for selectively engaging drive ratios simply through the application and release of individual frictional connection elements, preferably through fluid pressure actuation, and so that no gear shifting whatsoever is necessary either to establish forward or reverse drives by a neutral nondriving condition.

It will be further seen that, in addition to meeting these broad objects, each of the specific objects set forth at the beginning of the specification has been met in one or more of the three constructions shown herein. It will be understood that, while specific constructions have been shown and described in detail, numerous modifications might be resorted to without departing from the scope of my invention as set forth in the following claims.

I claim:

1. In an automatic fluid pressure operated transmission for a self-propelled vehicle wherein automatic shifting is adapted to take place under the influence of vehicle speed, a pump driven by the output shaft of said vehicle, a spring loaded piston actuated by the output pressure of said pump, and a fluid pressure exhaust slot progressively uncovered in response to the movement of said piston, said slot being uniform throughout the major portion of its effective opening and having a relatively large exhaust opening beyond the point representing the end of said piston's normal control travel, said piston being loaded by multiple springs adapted to provide more than a linear increase in resistance to said piston's travel, and an adjustable exhaust bleed independent of said slot adapted to compensate for variations in pump delivery due to manufacturing tolerances.

2. In an automatic fluid pressure operated transmission for a self-propelled vehicle wherein automatic shifting is controlled in response to changes in vehicle speed, a pair of fluid pressure pumps, one of which is adapted to be driven whenever the engine is running to provide a general source of fluid pressure for operating the transmission and the other of which is adapted to deliver fluid under pressure responsive to vehicle speed, a hydraulic control governor receiving said latter fluid under pressure, an orifice discharge for fluid delivered by said latter pump coacting with said governor to establish control characteristics, mechanism for converting the output of said latter pump to operate in lieu of said engine driven pump in supplying said general source of fluid pressure when said engine is not running, as in starting said engine through towing, comprising manually operated mechanism for closing said discharge orifice, and means for conducting the output of said vehicle driven pump to the output circuit of said engine driven pump.

3. In an automatic fluid pressure operated transmission for a self-propelled vehicle wherein automatic shifting is controlled in response to changes in vehicle speed, a pair of fluid pressure pumps, one of which is adapted to be driven whenever the engine is running to provide a general source of fluid pressure for operating the transmission and the other of which is adapted to deliver fluid under pressure responsive to vehicle speed, a hydraulic control governor receiving said latter fluid under pressure, an orifice discharge for fluid delivered by said latter pump coacting with said governor to establish control characteristics, mechanism for converting the output of said latter pump to operate in lieu of said engine driven pump in supplying said general source of fluid pressure when said engine is not running, as in starting said engine through towing, comprising manually operated mechanism for closing said discharge orifice, output circuits for said engine driven and vehicle driven pumps, a normally closed check valve interposed between said circuits for preventing flow from the engine driven pump circuit to the vehicle driven pump circuit whenever normal operating pressure is supplied by the engine driven pump, said check valve opening to establish flow from vehicle to engine driven pump circuits when the vehicle driven pump alone is operating, and an orifice restriction in series with such check valve adapted to prevent momentary reductions of pressure in the engine driven pump circuit from producing any substantial effect on the normal operation of said hydraulic governor.

4. In an automatic oil pressure operated transmission for a self-propelled vehicle wherein automatic controls are adversely effected by the high viscosity of control oil resulting from low temperature operation, an oil pump for supplying said control oil having intake and exhaust communication with a sump for a general supply of said oil, baffles in said sump adapted to localize circulation of a relatively small quantity of oil between said discharge and intake openings whenever said general supply reaches a relatively high viscosity whereby heat imparted by the working of said oil in said pump may be employed to rapidly raise the temperature of said localized oil prior to the rise in temperature of the general supply to one corresponding to suitable viscosity.

5. In an automatic oil pressure operated transmission for a self-propelled vehicle, an engine driven pump and a vehicle driven pump, automatic controls including a hydraulic governor operated by the discharge from said vehicle driven pump and adversely affected by the high viscosity of oil during low temperature operation, said engine driven pump and said vehicle driven pump having a common supply of oil with intake and discharge passages from and to said supply, means for assuring rapid heating of a localized portion of said oil for use by said vehicle driven pump comprising baffles directing the return oil from said engine driven pump as well as from said vehicle driven pump to a point closely adjacent the intake for said vehicle driven pump and also for conducting said discharge oil to a point closely adjacent the intake for said engine driven pump.

6. An automatic step-shift transmission for a self-propelled vehicle having an engine, throttle actuator and controls responsive to the differential effect of vehicle speed, and throttle opening, characterized by a differential control lever, mechanism responsive to vehicle speed for actuating said lever at one point and by linkage from the throttle actuator for actuating said lever at another point, said latter connection including a provision for lost motion whereby a limited range of throttle opening may be rendered ineffective to alter the position of said differential lever, said lost motion connection including a varying degree of lost motion for different positions of throttle opening.

7. Control mechanism as set forth in claim 6 wherein said lost motion connection includes a pair of cam surfaces associated with one portion of said linkage, a member for registering against one or the other of said cam surfaces in response to an opening or closing movement of said throttle, the space between said points of contact providing said lost motion effect, said cam surfaces and linkage being adapted to employ different points of contact on said cam surfaces in accordance with different conditions of vehicles speed and throttle opening whereby the extent of lost motion may be continuously varied to meet different conditions of vehicle speed and throttle opening.

8. An automotive vehicle automatic fluid pressure operated transmission wherein fluid pressure requirements for operating said transmission decrease with increase in vehicle speed, a pump for providing a supply of oil under pressure, and means for discharging excess pressure to a sump, a pressure control valve for regulating such pressure, and mechanism responsive to increasing vehicle speed for varying the effective pressure head established by said control valve in a manner whereby energy lost in pumping and recirculating oil against the supply pressure head may be reduced in accordance with reduced fluid pressure requirements.

9. An automotive vehicle automatic fluid pressure operated transmission wherein maximum fluid pressure requirements are reduced with increase in vehicle speed, an engine driven pump for maintaining a general supply of fluid under pressure, a vehicle driven pump adapted to establish a source of pressure increasing with vehicle speed, a pressure control valve adapted to open an exhaust port for oil delivered by said engine driven pump after a predetermined pressure head has been reached, an extension of said valve acted upon by pressure established by said vehicle-driven pump and adapted to supplement the engine driven pump pressure in opening said valve to an exhaust position.

10. In an automatic transmission for a self-propelled vehicle, multi-speed gearing, fluid pressure actuated mechanism selectively operable to render different speed ratios effective, a shift valve having at least three progressive positions for controlling the actuation of said fluid pressure mechanism, a manual shift lever and resilient linkage adapted to position said shift valve, fluid pressure operated mechanism for limiting the effective position to which said resilient linkage can move said shift valve, said latter mechanism being responsive to automatic controls, said shift valve and related controls being arranged in a manner whereby the position of said manual shift lever will determine the highest speed drive ratio at which said automatic controls will be operative.

11. An automotive vehicle automatic fluid pressure transmission wherein multi-speed gearing is subject to selective fluid pressure operation for rendering progressive speed ratios effective, a shift valve having progressive positions corresponding to said progressive speed ratios, a manual shift lever adapted to position said shift valve, resilient linkage interposed between the shift lever and valve operating between fixed limits to yieldably urge said valve to the position indicated by said shift lever, a plurality of fluid pressure actuated pistons adapted to limit successively the travel of said shift valve when pressure is applied thereto and to permit said resilient linkage to move said valve to successive speed positions when pressure is successively released therefrom, automatic controls responsive to driving requirements for establishing and releasing pressure for actuating said pistons, detent mechanism for holding said shift lever in any speed position to which it is manually moved, said shift valve and related controls being arranged to enable the position of said shift lever to limit the highest speed ratio at which said automatic controls will be effective and to accommodate manually initiated down shifts to any lower speed ratio, while enabling said automatic controls subject to such limits to automatically effect up and down shifts in accordance with changing driving requirements.

12. In an automatic transmission for a self-propelled vehicle, multi-speed gearing, selectively operable fluid pressure actuated frictional connections for rendering different speed ratios effective, a progressive shift from one speed ratio to another requiring the coordinated application of one frictional connection and release of a second frictional connection, mechanism for timing the release of said second frictional connection comprising a thrust valve interposed in the fluid pressure exhaust circuit for such frictional connection, a gear subjected to torque during the transmission of power in said one speed ratio having teeth adapted to subject said valve to a closing thrust prior to the transfer of drive and to permit said valve to open upon the engagement of said first frictional connection to a degree substantially relieving the torque load upon said gear.

13. In an automatic transmission for a self-propelled vehicle, multi-speed gearing, selectively operable fluid pressure actuated frictional connections for rendering different speed ratios effective, a progressive shift from one speed ratio to another requiring the coordinated application of one frictional connection and release of a second frictional connection, mechanism for timing the release of said second frictional connection comprising a thrust washer valve interposed in the fluid pressure exhaust circuit for such frictional connection, a gear subjected to torque during the transmission of power in said earlier speed ratio having helical teeth adapted to exert an axial force subjecting said valve to a closing thrust prior to the transfer of drive and to permit said valve to open upon the engagement of said first frictional connection to a degree substantially relieving the torque and resultant axial load upon said gear, and a spring holding said valve toward an open position adapted to cause release of frictional connection pressure somewhat in advance of torque release.

14. In a vehicle transmission, in combination, an input shaft, an output shaft, power transmitting means between said shafts including fluid pressure operated friction control means effective on an increase in the pressure of the fluid in operating chamber means to establish driving connection between said shafts, a supply passage, means for supplying fluid under pressure to said supply passage, valve means for at times connecting said operating chamber means to said supply passage and for at other times connecting said operating chamber means to exhaust, and a regulating valve for controlling the pressure of the fluid in said supply passage, said regulating valve comprising a valve element urged to the closed position by biasing means and movable therefrom to release fluid from said supply passage on an increase in the pressure of the fluid in said supply passage, and further means for exerting a force which opposes said biasing means and which increases in magnitude in accordance with the speed of one of said shafts.

15. In a vehicle transmission, in combination, an input shaft, an output shaft, power transmitting means between said shafts including fluid pressure operated friction control means effective on an increase in the pressure of the fluid in operating chamber means to establish driving connection between said shafts, a supply passage, means for supplying fluid under pressure to said supply passage, valve means for at times connecting said operating chamber means to said supply passage and for at other times connecting said operating chamber means to exhaust, and a regulating valve for controlling the pressure of the fluid in said supply passage, said regulating valve comprising a valve element having a closed position and movable therefrom to release fluid from said supply passage on an increase in the pressure of the fluid in said supply passage, biasing means yieldingly urging said valve element to its closed position and further means for reducing the effective magnitude of the force exerted on said valve element by said biasing means, said last-named means increasing in magnitude in accordance with the speed of one of said shafts.

16. In a vehicle transmission, in combination, an input shaft, an output shaft, power transmitting means between said shafts including fluid pressure operated friction control means effective on an increase in the pressure of the fluid in operating chamber means to establish driving connection between said shafts, a supply passage, means for supplying fluid under pressure to said supply passage, valve means for at times connecting said operating chamber means to said supply passage and for at other times connecting said operating chamber means to exhaust, means for supplying a control fluid at a pressure which varies in accordance with the speed of one of said shafts, a relief valve comprising a valve element movable from a closed to an open position on an increase in the pressure of the fluid in said supply passage, biasing means yieldingly urging said valve element to the closed position, and further means responsive to said control fluid for reducing the effective force exerted by said biasing means.

References Cited in the file of this patent

UNITED STATES PATENTS

| | | |
|---|---|---|
| 638,853 | Snyder | Dec. 12, 1899 |
| 917,466 | Lees | Apr. 6, 1909 |
| 1,231,529 | Pollard | June 26, 1917 |
| 1,256,373 | Rowledge | Feb. 12, 1918 |
| 1,958,303 | Hayes | May 8, 1934 |
| 2,019,146 | Livermore | Oct. 29, 1935 |
| 2,057,151 | Kirschner | Oct. 13, 1936 |
| 2,064,295 | Crane | Dec. 15, 1936 |
| 2,086,576 | Price | July 13, 1937 |
| 2,102,781 | Bieretz | Dec. 21, 1937 |
| 2,144,795 | Cotterman | Jan. 24, 1939 |
| 2,152,120 | Whittington | Mar. 28, 1939 |
| 2,177,904 | Maybach | Oct. 3, 1939 |
| 2,182,621 | Dodge | Dec. 5, 1939 |
| 2,190,256 | Cheek | Feb. 13, 1940 |
| 2,190,831 | Dodge | Feb. 20, 1940 |
| 2,194,954 | Ravigneaux | Mar. 26, 1940 |
| 2,195,783 | Ravigneaux | Apr. 2, 1940 |
| 2,204,872 | Thompson | June 18, 1940 |
| 2,214,335 | Kurti | Sept. 10, 1940 |
| 2,220,174 | Ravigneaux | Nov. 5, 1940 |
| 2,223,716 | Bojesen | Dec. 3, 1940 |
| 2,239,973 | Ravigneaux | Apr. 29, 1941 |
| 2,277,214 | Dodge | Mar. 24, 1942 |
| 2,282,591 | Orr | May 12, 1942 |
| 2,291,189 | Matulaitis | July 28, 1942 |
| 2,303,975 | Banker | Dec. 1, 1942 |
| 2,307,619 | Brewer | Jan. 5, 1943 |
| 2,331,781 | Hollander | Oct. 2, 1943 |
| 2,352,212 | Lang | June 27, 1944 |
| 2,371,574 | Swennes | Mar. 13, 1945 |
| 2,397,636 | Pennington | Mar. 26, 1946 |
| 2,418,378 | Voytech | Apr. 1, 1947 |
| 2,435,058 | Thomas | Jan. 27, 1948 |
| 2,446,730 | Wemp | Aug. 10, 1948 |
| 2,461,218 | Lapsley | Feb. 8, 1949 |
| 2,516,203 | Greenlee | July 25, 1950 |
| 2,516,208 | Hasbany | July 25, 1950 |
| 2,519,050 | Kelbel | Aug. 15, 1950 |
| 2,528,585 | Farkas | Nov. 7, 1950 |
| 2,529,400 | Lapsley | Nov. 7, 1950 |
| 2,530,200 | Hobbs | Nov. 14, 1950 |
| 2,536,473 | Sinclair | Jan. 2, 1951 |
| 2,549,125 | Paton | Apr. 17, 1951 |
| 2,577,413 | Frailing | Dec. 4, 1951 |

FOREIGN PATENTS

| | | |
|---|---|---|
| 372,692 | France | Apr. 13, 1907 |
| 607,120 | Great Britain | Aug. 26, 1948 |